Figure 11:
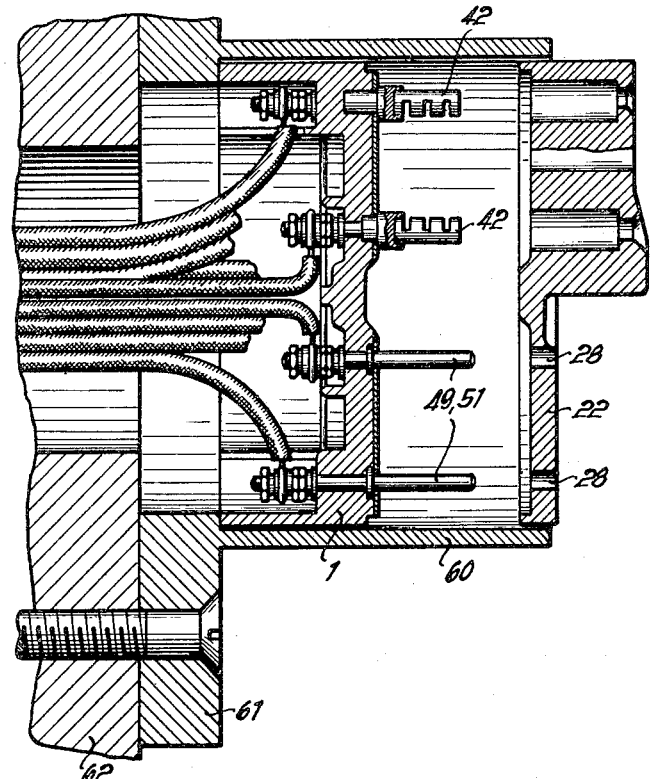

Oct. 2, 1956  U. TUCHEL  2,765,449
ELECTRIC COUPLING
Filed Sept. 25, 1953  4 Sheets-Sheet 1
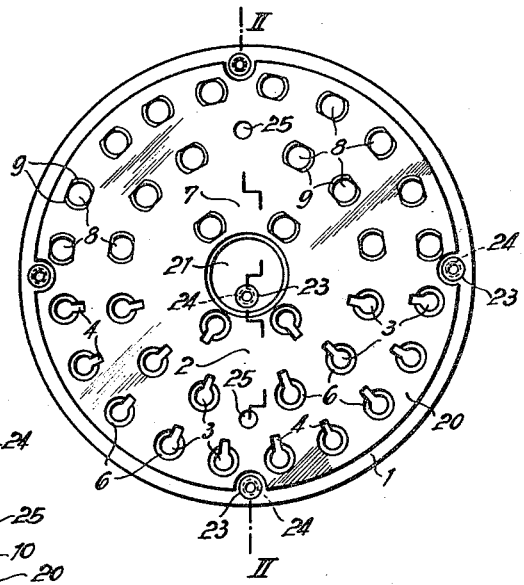
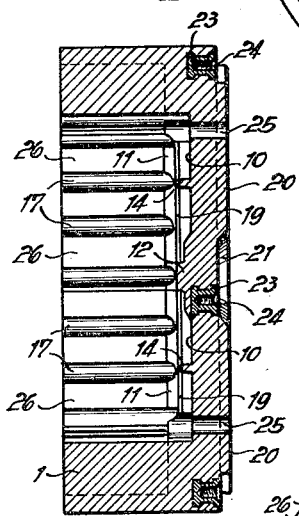
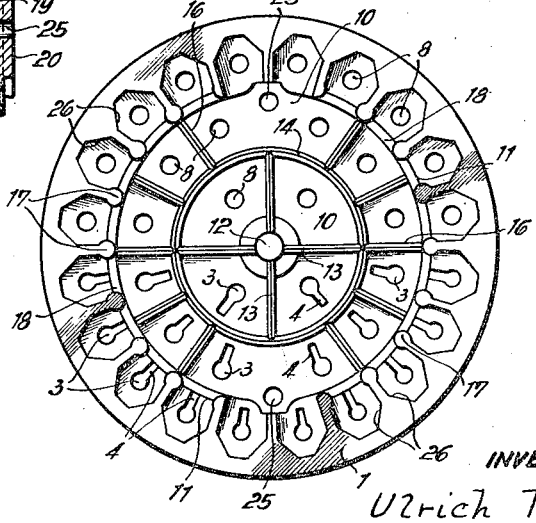
INVENTOR
Ulrich Tuchel
By
Young, Ewen & Thompson
Attys.

Oct. 2, 1956  U. TUCHEL  2,765,449
ELECTRIC COUPLING
Filed Sept. 25, 1953  4 Sheets-Sheet 2
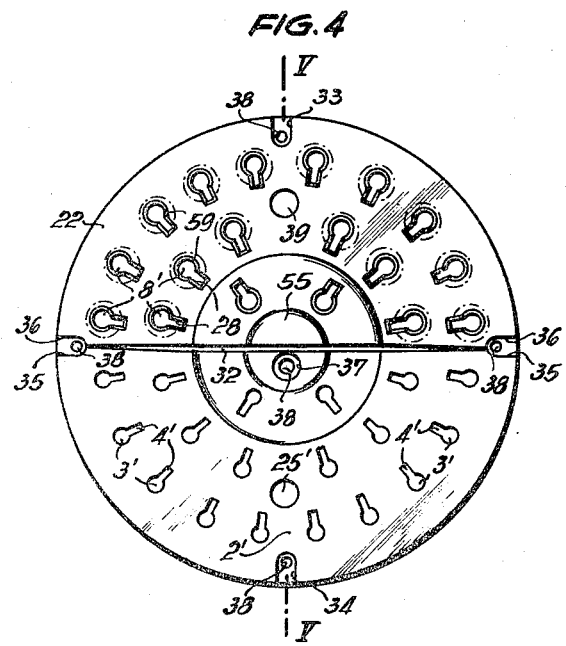
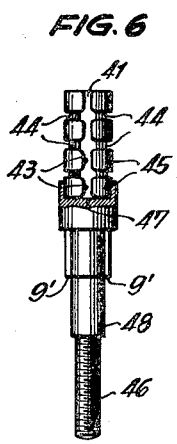
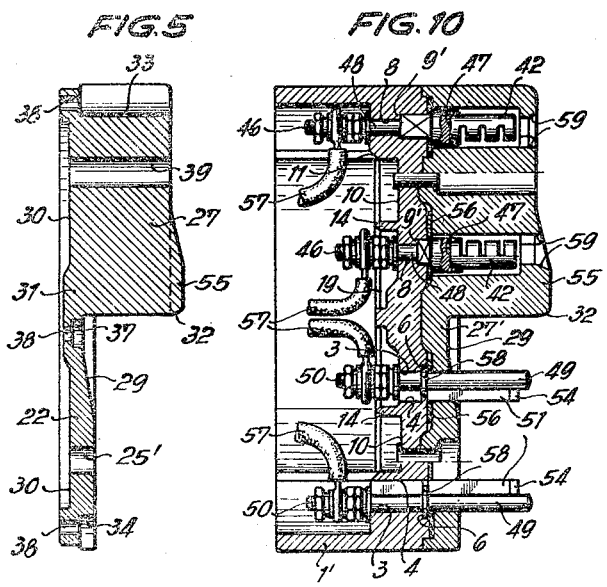
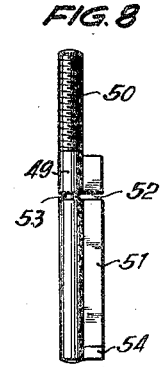
INVENTOR
Ulrich Tuchel
By Young, Emery & Thompson
Attys.

Oct. 2, 1956 U. TUCHEL 2,765,449
ELECTRIC COUPLING
Filed Sept. 25, 1953 4 Sheets-Sheet 3

INVENTOR
Ulrich Tuchel
By Young, Emery & Thompson
Attys.

United States Patent Office 2,765,449
Patented Oct. 2, 1956

2,765,449

ELECTRIC COUPLING

Ulrich Tuchel, Heilbronn (Neckar), Germany

Application September 25, 1953, Serial No. 382,442

Claims priority, application Germany January 31, 1953

2 Claims. (Cl. 339—184)

This invention relates to electrical couplings or connectors of the kind comprising two coupling elements one of which has a lug and the other a groove extending in the direction of engagement of the elements and which have to be turned into alignment whereby the elements can be connected only in the polar position thus determined.

According to the present invention the electrical coupling contains the following features in combination:

(a) In the axial movement which constitutes the first step in coupling the elements together, the parts which serve for centering the elements and to act as guide means in the axial direction, are in the form of guide sleeves, (b) One half of the coupling face of each element forms an enlargement extending over the entire half and permitting axial engagement of the elements only in one determined position, usually after a rotation of one element relatively to the other, constituting a second step in coupling the elements together, and (c) In the enlargement of at least one of the coupling elements there are provided contact members behind bores for the insertion, in a third step in the coupling operation, of counter contact elements arranged adjacent the enlargement of the other contact element.

In the first step of the coupling operation the elements are centered, that is, come into co-axial relation. Therefore they are axially aligned before their enlargements come into contact. As a consequence, in the next or second coupling step in which one element is rotated relatively to the other, there is avoidance of the possibility, heretofore present, that individual non-corresponding contact members will come into contact and thereby create undesired electrical connections or present desired connections. The contact members arranged in the enlargements are well protected and mechanically fully relieved of stress. During the turning movement the coupling elements remain in the same axis and when the enlargements are in proper relative position the third coupling operation can take place in which the contact members enter bores also acting as guide means and only meet the counter contacts after passing behind said bores. The contact members to be connected make contact with each other substantially at the same instant, or, if required by the electrical conditions, may do so in single pairs or groups in sequence, by making the contact members of stepped lengths.

In one embodiment of the invention at least one coupling element is in the form of a body of insulating material carrying the contact members, and a cover, preferably removably attached to said body, which cover also forms an enlargement extending over the contact members disposed on the one half of the coupling face. In the preferred construction with removable cover it is easily possible to clean the internal coupling parts, especially the contact members, which is of great advantage particularly when the coupling is used in the open air, for example in railway use, exposed to dust, ash, and abraded material from braking efforts on the wheels.

In another embodiment the enlargement has a preferably flat ridge extending towards the middle of the coupling face, and on the co-acting coupling face of the other coupling element there is provided a corresponding depression. This reduces the surface friction during turning of the coupling elements in the second step of operation because only the ridge and depression are in contact.

In one construction of the invention both coupling elements are reversible for which purpose each element carries inter-engaging contact members on both halves of its coupling face arranged in mirror image similarly to a bisected line of said face, and has the enlargement on one coupling face half. This reduces the cost of making the coupling. In use the cable ends to be connected carry positive coupling parts corresponding to each other and in connecting the coupling parts to the cable ends it is not necessary to take care that the desired coupling part is mounted on the right cable end.

Preferably all the socket contact members are arranged in the enlargement and all the plug contact members in the free half surface, since the socket members are more easily damaged than the plug members.

The plug members preferably have contact blades and the socket members are adapted to engage the plug members over a small contact area relatively to their total area and with elastic pressure, that is the contact members engage each other with a high specific contact pressure, for which purpose said socket members comprise a plurality of elastic jaws formed by transverse slits in the socket wall and extending in a row in the direction of engagement of the plugs in the sockets. Such contact members have the advantage of being self-cleaning.

A further feature of the invention is that the contact members are held with play in the coupling elements, whereby corresponding members readily align with each other without mechanical stress, and in the case of multipole couplings in which irregularities in the contact disposition are liable to occur, these are allowed for by the play provided. Preferably, the contact fastenings on the fastening side of each coupling element, are disposed in groups and the individual groups arranged on rows of bosses, by providing annular shoulders on the cable fastening end of the coupling element, on which shoulders the contact fastenings are arranged. This facilitates the attachment of the cable and the separate fastenings are properly spaced.

Further features and objects will appear from the following description when considered in connection with the accompanying drawings in which:

Figure 1 is a top face view of the coupling members,

Figure 2 is a cross section of the coupling member taken on line II—II of Figure 1, Figure 3 is a bottom face view of the coupling member of Figure 1, Figure 4 is a plan view of a removable cover, Figure 5 is a cross section of the cover taken on line V—V of Figure 4, Figure 6 is a side elevation of one of the socket members, Figure 7 is a top plan view of the socket member of Figure 6, Figure 8 is a side view of the plug contact member, Figure 9 is a top view of the plug contact member of Figure 8, and Figure 10 is a cross section of a modified structure of the coupling member and cover.

Figures 1–3 show a coupling element with the contact members removed, said element comprising a cylindrical body 1 of insulating material and arranged in a sleeve of metal or other material, not shown, which acts as a guide and centering means in approaching the two coupling elements to each other in the first operating step of engaging the coupling elements. On its front or coupling face the body 1 has, disposed over the lower half 2 of said face, a large number, for example eighteen, bores 3 adapted for the insertion of plug contact members, each having a radially directed blade, said bores having grooves on one side for engagement by said blades. The bores 3 also have shoulders 6 to retain rings 58, Figure 10, mounted on the plug members to prevent their shifting when pressure in the axial direction is exerted on them in the third operating step hereinafter described. On the upper half 7 of the coupling face there is provided a similar number, eighteen, of bores 8 adapted for insertion of socket contact members hereinafter described. These bores 8 have shoulders 9 on two opposite sides engaged by corresponding annular shoulders on the socket contact members when these are engaged by the plug contact members.

On the cable fastening side, see Figures 2 and 3, the body 1 is provided with raised surfaces 10, 11 constituting rows of bosses on which the cable fastenings are arranged, which facilitates the connection of the cable to the rear ends of the contact members. In the example shown in Figures 1–3 there are two such raised surfaces of different levels, in the direction of the cable to be connected, namely an inner low level circular surface 10 and a surrounding high level annular surface 11. Preferably the fastenings on the surface 10 are tightened first, then those on the surface 11.

Between all the connection terminals arranged above the bores 3 and 8 on the fastening side are arranged partitions for extending the electrical leakage path and avoiding short circuiting between cables. From a central boss 12, for this purpose four walls 13 extend at right angles to each other towards the periphery of the element 1. Two of these walls end in a circular partition 14, two others extend to the outermost annular shoulder 11. In the annular space between the circular partition 14 and the shoulder 11 there are arranged other radially extending partitions 16. The partitions 13, 14 and 16 separate all the fastenings corresponding to the bores 3, 8 on an inner and an intermediate circle. The fastenings corresponding to the bores on the outer circle, that of the ring shoulder 11, lie in recesses 26 extending parallel to the cable and provided in the element 1, which recesses have, at their ends facing the middle, round reinforcing strips 17 projecting up to a bevel 18 on the annular shoulder 11. The partitions 13, 14 and 16 are bevelled at their edges 19 whereby a thin film of moisture such as might be produced by water of condensation, will be thrown off at the sharp edges of the bevels, the more forcibly the more acute the angle between the bevelled surfaces and between these surfaces and the wall surfaces, since the surface tension there is less. The arrangement of the partitions corresponds to the bores for the contact members.

The element 1 has on its front face a disc shaped boss 20 having a central depression 21, for fitting a removable cover 22, Figures 4 and 5, held in place on the element, for example by means of screws engaging threaded bushings 24 inserted in holes 23 in said element 1. Further holes 25 serve for the passage of fastenings such as screws for securing the coupling element in a housing or the like. The cover 22 on the front of the body of the element 1 has bores 3′, 8′ corresponding to the bores 3, 8 in said body. The bores 3′ have grooves 4′ and are formed in the lower half 21 of the coupling face, while the bores 8′ are in the upper half, which forms an enlargement 27 extending over the entire upper half and which allows a second coupling element provided with a similar enlargement 27 to engage with the first element only in one definite polar position. The bores 8′ are round internally for nearly the whole depth of the cover 22 as shown in broken lines in Figure 4, but forwardly they have a key-hole shaped profile with a groove 28. The round portions of these bores receive the front also round tubular portions of the socket contact members to be fixed in the coupling element 1 up to behind the key-hole shaped openings in the cover 27. The mouths of the bores 8′, 28 are bevelled at 59 for easy engagement with the plug contact members.

On the face of the coupling element directed towards the similar element shown at the right in Figure 5, when said elements are in the engaged position, the enlargement 27 is provided with a flat ridge 55 extending towards the middle and which fits in a recess formed in the flat cover portion of the other coupling element. The cover 22 shown in Figure 5 also has such a recess designated 29. By these means the surface friction between two coupling elements moved against each other while being turned into the operative polar position, is kept low. To further facilitate the engagement in the correct position the end of the ridge 55 facing the middle is bevelled at 32.

On its surface directed to the element body 1 the cover 27 has a depression 30 corresponding to the boss 20 on the body 1 in the center of which depression is a boss 31 fitting the depression 21, Figure 2, in said element body. Holes 38 serve to receive screws for attaching the cover on the body 1. Above the holes 38 the cover has openings 33 to 37 for the insertion of the screws. Finally the cover has bores 25′ and 39 corresponding to the bores 25 in the body 1.

The socket contact members, Figures 6 and 7, to be inserted in the bores 8 of the element body 1 consist of two inter-engaging sleeves 41, 42 which are slotted at 43 in the direction of coupling engagement and also have several transverse slots 44, which constitute resilient jaws 45 presenting a small contact area relatively to their total area and contact pressure. In the present example the jaws engage resiliently the contact blades of a co-operating plug contact member at the edges of the slots. The sleeves 41, 42 are inserted in a bushing 47 formed in a screw-threaded bolt 48, and are soldered in said bushing with hard solder, by high frequency heating. The upper part of the bolt 48 without screw threads, shown in Figure 6, has shoulders 9′ fitting with the shoulders 9 in the element body 1, while the screw threaded part 46 which extends through said body to the fastening side, is used for the attachment of the electric cable by means of nuts.

The plug contact member 49 at its upper portion as shown in Figure 8 has screw threads 50 similarly serving for the attachment of an electric cable at the fastening side of the element body 1. The smooth lower portion has a contact blade 51, slotted at 52, and bevelled at its front end 54. At the slot 52 the plug part of the contact member 49 has an annular groove 53 for retaining ring 58, Figure 10. This contact member having plug and blade portions is strong and has large guide surfaces for coupling engagement, contributing to reliability in operation.

In the modification shown in Figure 10 the element body 1′ and its cover 27′ are shown connected and the contact members in place, with cables fastened at their rear ends. Both coupling elements are similar and reversible. All the plug contact members 49 are in the lower half and all the socket contact members 42 are in the upper half. Between the cover and the body a gasket 56 is inserted. Preferably spacer sleeves of insulating material are inserted in the bores 25, 25′ to prevent breakage of the body 1 from excessive tightening of the attachment screws and to increase the insulation with respect to the surrounding housing.

In the operations of engaging the coupling elements, the guide means for the coupling elements, that is, the sleeves in the hereinbefore described examples, are first engaged so that both coupling elements are aligned in the axial direction. Next they are pushed together until the enlargements 27 or the ridges 55 thereon come into contact. Then the elements are rotated relatively to each other about their common axis until each enlargement 27 lies opposite the proper half of the coupling face of the other coupling element (second operation step), and finally the elements are further pushed together (third operational step) causing the plug contact members to pass into the aligned socket openings and after further guided travel to bring all the contact members into fully closed condition without mechanical stressing thereof.

Figure 12:
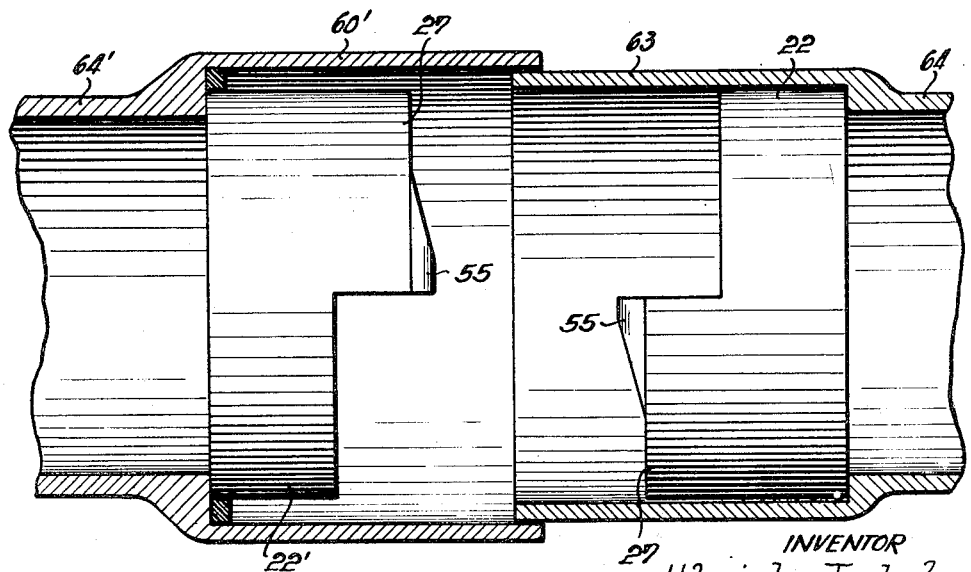
Figure 13:
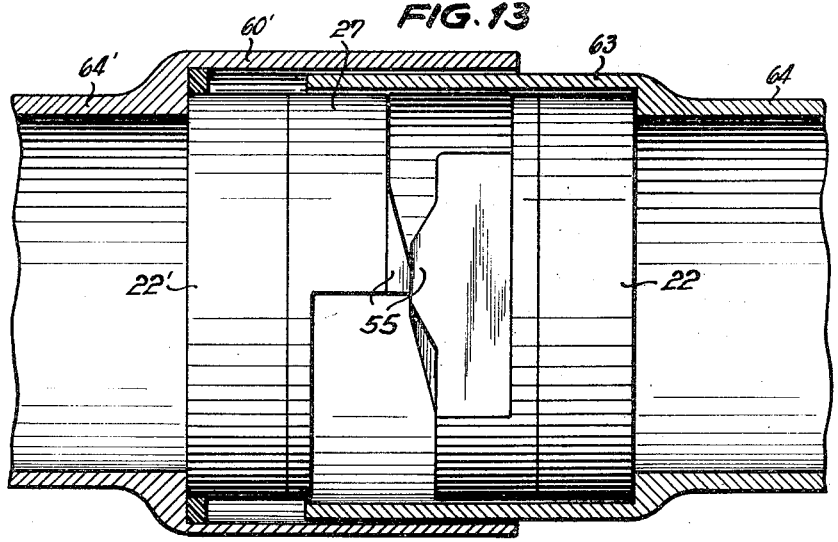

Fig. 11 shows a guide casing 60 for a coupling member 1, the cover 22 of which has been shown as separated therefrom. The casing 60 is integral with a flange 61 by means of which the coupling may be secured on a panel or wall, as for example on a wall of a railway car. That the casing 60 has been shown and provided with a flange 61 is not important and not necessary, since the casing may be used in other ways and can be applied anywhere and for other purposes. For that reason Figs. 12, 13 and 14 have been shown in which the casing 60' with its interfitting and telescoping casing 63 have been shown with reduced section 64' for casing 60' and section 64 for casing 63 of a cable structure. The cover parts 22 and 22' have already been described in detail. In connecting the two parts of the coupling together, the guide casings or parts 63 and 60' will centralize themselves one in the other in telescoping fashion as shown in Fig. 12. Upon the further relative inward movement of the casing 63 into the casing 60', the ridges 55 of the insulated covers will contact each other but the contacts do not yet contact each other, Fig. 13. When however the coupling parts or halves are now rotated relative to each other, the casing 63 will be guided into the casing 60' with only a slight frictional contact of the ridges 55 to be overcome, to thus achieve the correct alignment and contact of the contacts.

Figure 14:
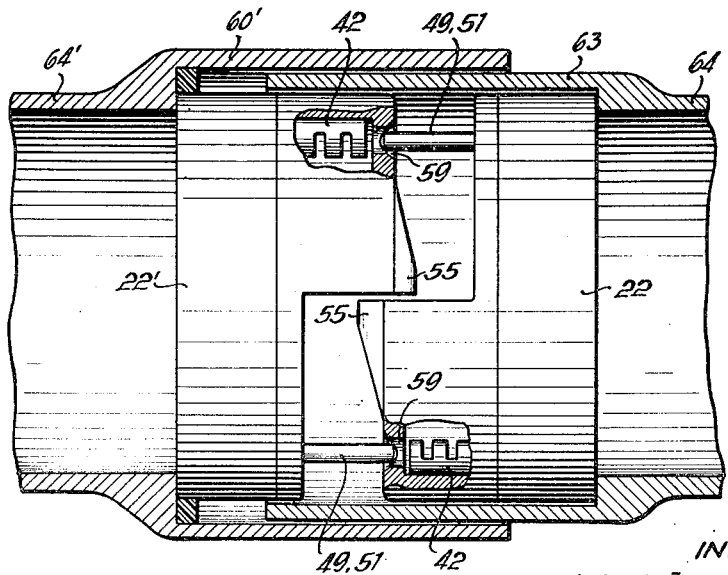

In this position the enlargements 27 of the covers 22 and 22' will be in such positions that they can slide one beside the other, Fig. 14. When the parts of the coupling are now moved one into the other in axial direction, the contact members 49 and 51 will pass through respective holes 28 having chamfered edges 59 in the respective counter pieces whereby they will still be insulated from each other. Only upon further axial movement will it be attained that the members 49 and 51 will project into the contact sleeves 42. The actual contact elements will grip each other only when they are mechanically completely inserted so that their spring parts 42 will not become disengaged. This is particularly useful for use on railways.

I claim:

1. An electrical coupling comprising, a pair of coupling elements engageable with each other by successive rotary and axial movement, a sleeve surrounding each coupling element, said sleeves being inter-engageable in telescoping relationship to center and guide said elements, a plurality of cooperating plug and socket contact members mounted in said coupling elements, and an enlargement extending over one half of the coupling face of each coupling element, said enlargement permitting engagement of said plug contact members in said socket contact members only in one polar position of the coupling elements with respect to each other, said coupling elements having contact members in its enlargement disposed behind bores providing passage for the engagement of plug contact members in corresponding socket contact members upon further axial approach of said elements following their relative turning into said aligned polar position, at least one of the coupling elements consisting of a body of insulating material carrying the contact members, and a cover forming the enlargement extending over the contact members in one half of the coupling face of the element, the enlargement having a flat ridge extending towards the middle of the coupling face, and the co-acting coupling face of the other coupling element having a corresponding depression.

2. An electrical coupling comprising, a pair of coupling elements engageable with each other by successive rotary and axial movements, a sleeve surrounding each coupling element, said sleeves being inter-engageable in telescoping relationship to center and guide said elements, a plurality of cooperating plug and socket contact members mounted in said coupling elements, and an enlargement extending over one half of the coupling face of each coupling element, said enlargement permitting engagement of said plug contact members in said socket contact members only in one polar position of the coupling elements with respect to each other, said coupling elements having contact members in its enlargement disposed behind bores providing passage for the engagement of plug contact members in corresponding socket contact members upon further axial approach of said elements following their relative turning into said aligned polar position, and a cover forming the enlargement extending over the contact members in one half of the coupling face of the element, the enlargement having a flat ridge extending towards the middle of the coupling face.

References Cited in the file of this patent

UNITED STATES PATENTS

| 2,014,853 | Ley | Sept. 17, 1935 |
|---|---|---|
| 2,124,207 | Nee Sen | July 19, 1938 |
| 2,386,177 | Andersen | Oct. 9, 1945 |
| 2,387,630 | Weakley | Oct. 23, 1945 |
| 2,421,155 | Miller | May 27, 1947 |
| 2,444,843 | Modrey | July 6, 1948 |
| 2,466,370 | Burtt | Apr. 5, 1949 |
| 2,532,538 | Burtt | Dec. 5, 1950 |
| 2,556,956 | Benton | June 12, 1951 |

FOREIGN PATENTS

| 216,786 | Switzerland | Jan. 5, 1942 |
|---|---|---|
| 353,176 | France | June 22, 1905 |
| 487,606 | Germany | Dec. 14, 1929 |